(12) United States Patent
Yamanashi et al.

(10) Patent No.: US 10,264,870 B2
(45) Date of Patent: *Apr. 23, 2019

(54) MAKEUP APPLICATION ASSISTANCE DEVICE, MAKEUP APPLICATION ASSISTANCE SYSTEM, AND MAKEUP APPLICATION ASSISTANCE METHOD

(71) Applicant: PANASONIC INTELLECTUAL PROPERTY MANAGEMENT CO., LTD., Osaka (JP)

(72) Inventors: Tomofumi Yamanashi, Kanagawa (JP); Rieko Asai, Osaka (JP); Aoi Muta, Osaka (JP); Chie Nishi, Kanagawa (JP); Kaori Ajiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 216 days.

This patent is subject to a terminal disclaimer.

(21) Appl. No.: 15/010,122

(22) Filed: Jan. 29, 2016

(65) Prior Publication Data
US 2016/0143420 A1 May 26, 2016

Related U.S. Application Data

(63) Continuation of application No. 14/388,998, filed as application No. PCT/JP2014/000247 on Jan. 20, 2014.

(30) Foreign Application Priority Data

Feb. 1, 2013 (JP) .................................. 2013-018274

(51) Int. Cl.
G09B 19/00 (2006.01)
A45D 44/00 (2006.01)

(52) U.S. Cl.
CPC ....... *A45D 44/005* (2013.01); *G09B 19/0076* (2013.01); *A45D 2044/007* (2013.01)

(58) Field of Classification Search
CPC ............ A45D 44/005; A45D 2044/007; G09B 19/0076
(Continued)

(56) References Cited

U.S. PATENT DOCUMENTS

2003/0149504 A1 8/2003 Iwaki et al.
2006/0178904 A1* 8/2006 Aghassian ........... A45D 44/005
705/1.1
(Continued)

FOREIGN PATENT DOCUMENTS

JP 2001-346627 12/2001
JP 2003-044837 2/2003
(Continued)

OTHER PUBLICATIONS

U.S. Office Action issued in U.S. Appl. No. 14/388,998, dated Mar. 10, 2017.
(Continued)

*Primary Examiner* — Robert P Bullington
(74) *Attorney, Agent, or Firm* — Greenblum & Bernstein, P.L.C.

(57) ABSTRACT

A makeup assisting apparatus includes a makeup collector that collects, from each of a plurality of people, an applied makeup information item indicating makeup selected by the person as makeup to be applied in a makeup application, a makeup analyzer that estimates fashionable makeup by analyzing the collected applied makeup information items and determines a selection criterion in such a way that the estimated fashionable makeup is selected, and a makeup presenter that selects makeup based on the determined selection criterion and presents proposed makeup informa-
(Continued)

tion indicating the selected makeup and cosmetics information of cosmetics required for applying the makeup to the user.

3 Claims, 15 Drawing Sheets

(58) Field of Classification Search
USPC .......................................................... 434/100
See application file for complete search history.

(56) References Cited

U.S. PATENT DOCUMENTS

| | | |
|---|---|---|
| 2007/0078849 A1 | 4/2007 | Slothouber |
| 2011/0184831 A1 | 7/2011 | Dalgleish |
| 2012/0223956 A1 | 9/2012 | Saito et al. |
| 2015/0049111 A1 | 2/2015 | Yamanashi et al. |
| 2015/0050624 A1 | 2/2015 | Yamanashi et al. |
| 2015/0118655 A1 | 4/2015 | Yamanashi et al. |

FOREIGN PATENT DOCUMENTS

| | | |
|---|---|---|
| JP | 2004-220200 | 8/2004 |
| JP | 2010-017360 | 1/2010 |
| JP | 4809056 | 11/2011 |
| JP | 2012-181688 | 9/2012 |
| WO | 02/08983 | 1/2002 |

OTHER PUBLICATIONS

International Search Report from PCT/JP2014/000247, dated Mar. 18, 2014.
European Search Report in European Patent Application No. 14746673.4, dated Apr. 28, 2015.
U.S. Appl. No. 15/010,130 to Tomofumi Yamanashi et al., filed Jan. 29, 2016.

* cited by examiner

510

| 511 | 512 | 513 | 514 | 515 | 516 |
|---|---|---|---|---|---|
| MAKEUP PATTERN ID | MAKEUP TYPE | COLOR | CONCENTRATION | RANGE | COSMETICS ID |
| MP 1 | MT 1 | C 1 | D 1 | A 1 | I 1 |
| MP 1 | MT 2 | C 2 | D 2 | A 2 | I 2 |
| MP 1 | MT 3 | C 3 | D 3 | A 3 | I 3 |
| MP 1 | MT 4 | C 3 | D 2 | A 4 | I 4 |
| MP 2 | MT 1 | C 8 | D 2 | A 1 | I 9 |
| ... | ... | ... | ... | ... | ... |

FIG. 5

| COSMETICS ID | COMPANY ID | ITEM NUMBER |
|---|---|---|
| i 1 | B 1 | b 1 1 |
| i 2 | B 1 | b 2 3 |
| ... | ... | ... |

| 641 | 642 | 643 | 644 |
|---|---|---|---|
| TERMINAL ID | PERSON ID | MAKEUP PATTERN ID | FACIAL FEATURE VALUE |
| C 1 | H 1 | M P 1 | d 1 1, d 1 2, ... |

| 651 | 652 | 653 |
|---|---|---|
| TERMINAL ID | PERSON ID | MAKEUP PATTERN ID |
| C 1 | H 1 | M P 1 |

| TERMINAL ID | PERSON ID | MAKEUP PATTERN ID | FACIAL FEATURE VALUE | RECEPTION TIME |
|---|---|---|---|---|
| 671 | 672 | 673 | 674 | 675 |
| C1 | H1 | MP1 | d11, d12, ... | T1 |
| C2 | H2 | MP2 | d21, d22, ... | T2 |
| C3 | H3 | MP2 | d31, d32, ... | T3 |
| C1 | H1 | MP3 | d11, d12, ... | T4 |
| ... | ... | ... | ... | ... |

| 681 | 682 |
|---|---|
| FACIAL FEATURE VALUE GROUP | MAKEUP PATTERN ID |
| G 1 | M P 1 |
| G 2 | M P 2 |
| G 3 | M P 3 |
| ⋮ | ⋮ |

*FIG. 16*

MAKEUP APPLICATION ASSISTANCE DEVICE, MAKEUP APPLICATION ASSISTANCE SYSTEM, AND MAKEUP APPLICATION ASSISTANCE METHOD

CROSS-REFERENCE TO RELATED APPLICATIONS

This application is a continuation application of co-pending U.S. patent application Ser. No. 14/388,998, filed Sep. 29, 2014, which is a National Phase of PCT Patent Application No. PCT/JP2014/000247 having International filing date of Jan. 20, 2014, which is claims priority of Japanese Patent Application No. 2013-018274, filed Feb. 1, 2013, the disclosures of which are expressly incorporated by reference herein.

TECHNICAL FIELD

The present invention relates to a makeup assisting apparatus, a makeup assisting system and a makeup assisting method for assisting facial makeup (cosmetic makeup).

BACKGROUND ART

In recent years, the way of making up the face (hereinafter, simply referred to as "makeup") has been diversified. It has become difficult, particularly for a person who has no sufficient knowledge about makeup to select appropriate makeup from countless numbers of options for makeup, because it takes an enormous amount of time and effort to actually try, judge and compare various types of makeup.

To address the above-described problem, techniques of generating and presenting a simulation image which simulates the face to which makeup is applied are disclosed in, for example, PTL 1 to PTL 3. In the techniques disclosed in PTL 1 to PTL 3 (hereinafter, referred to as "related art"), a captured image of the face to which makeup is to be applied (hereinafter, simply referred to as the "face") is acquired. Further, with the related art techniques, the simulation image is generated by superimposing, on the acquired image, an image indicating a state of makeup, such as a lipstick and blush, when the makeup is applied to the face. With the related art, the generated simulation image is displayed at a display apparatus.

The related art allows a user to judge whether the makeup is good or bad without actually applying the makeup, thus allowing the user to select appropriate makeup with less time and effort.

However, when a lot of options for makeup are available, which option of makeup should be used to generate a simulation image becomes a problem. For example, if options of makeup inappropriate for the face of the user are continuously selected as a target for which a simulation image is to be generated (hereinafter, referred to as a "simulation target"), it may take a long time to obtain a simulation image of appropriate makeup.

To address the above problem, PTL 3 discloses a technique of selecting a simulation target from a plurality of options of makeup prepared in advance based on a predefined selection criterion. This technique enables the simulation target to be automatically narrowed down to appropriate makeup.

CITATION LIST

Patent Literature

PTL 1
Japanese Patent Application Laid-Open No. 2001-346627
PTL 2
Japanese Patent Application Laid-Open No. 2003-44837
PTL 3
Japanese Patent Application Laid-Open No. 2010-017360

SUMMARY OF INVENTION

Technical Problem

However, in recent years, the speed of change in the trend of makeup has been accelerated along with diversification of makeup. Therefore, it has become difficult to accurately recognize what kind of makeup is actually in fashion from time to time. Accordingly, in the technique disclosed in PTL 3, if makeup of the latest fashion is not prepared as an option or if a selection criterion which does not match makeup of the latest fashion is set, inappropriate makeup which is different from the makeup of the latest fashion may be selected.

That is, the related art has a problem in that it is impossible to appropriately assist makeup if the trend of makeup changes over time.

It is therefore an object of the present invention to provide a makeup assisting apparatus, a makeup assisting system and a makeup assisting method which enable appropriate assistance for makeup even if the trend of makeup changes over time.

Solution to Problem

A makeup assisting apparatus according to an aspect of the present invention includes: a makeup collecting section that collects, from each of a plurality of persons, an applied makeup information item indicating makeup selected by the person as makeup to be applied in makeup; a makeup analyzing section that estimates fashionable makeup by analyzing the collected applied makeup information items and that determines a selection criterion in such a way that the estimated fashionable makeup is selected; and a makeup presenting section that selects makeup based on the determined selection criterion and that presents a proposed makeup information item indicating the selected makeup to a user.

A makeup assisting system according to an aspect of the present invention includes: a plurality of terminals; and a server configured to communicate with each of the plurality of terminals through a communication network, in which: the terminal includes: a makeup acquiring section that acquires an applied makeup information item indicating makeup selected by a user of the terminal as makeup to be applied in makeup; and a makeup reporting section that transmits the acquired applied makeup information item to the server; and the server includes: a makeup collecting section that accumulates the applied makeup information items transmitted from of the plurality of terminals; a makeup analyzing section that estimates fashionable makeup by analyzing the accumulated applied makeup information items and determines a selection criterion in such a way that the estimated fashionable makeup is selected; and a makeup presenting section that selects makeup based on the determined selection criterion and that presents a proposed makeup information item indicating the selected makeup to a user receiving assistance for the makeup.

A makeup assisting method according to an aspect of the present invention includes: collecting from each of a plurality of persons, an applied makeup information item indicating makeup selected by the person as makeup to be applied in makeup; estimating fashionable makeup by analyzing the collected applied makeup information items and determining a selection criterion in such a way that the estimated fashionable makeup is selected; selecting makeup based on the determined selection criterion; and presenting a proposed makeup information item indicating the selected makeup to a user.

Advantageous Effects of Invention

According to the present invention, it is possible to appropriately assist makeup even if the trend of makeup changes over time.

BRIEF DESCRIPTION OF DRAWINGS

FIG. 5 illustrates an example of a makeup pattern table in Embodiment 2;

FIG. 6 illustrates an example of a cosmetics table in Embodiment 2;

FIG. 11 illustrates an example of an applied makeup message in Embodiment 2;

FIG. 12 illustrates an example of a proposed makeup message in Embodiment 2;

FIG. 15 illustrates an example of a user information record group in Embodiment 2; and FIG. 16 illustrates an example of a makeup analysis result table in Embodiment 2.

DESCRIPTION OF EMBODIMENTS

Each embodiment of the present invention will be described in detail below with reference to the accompanying drawings.

Embodiment 1

Embodiment 1 of the present invention is an example of a basic mode of the present invention.

Figure 1:
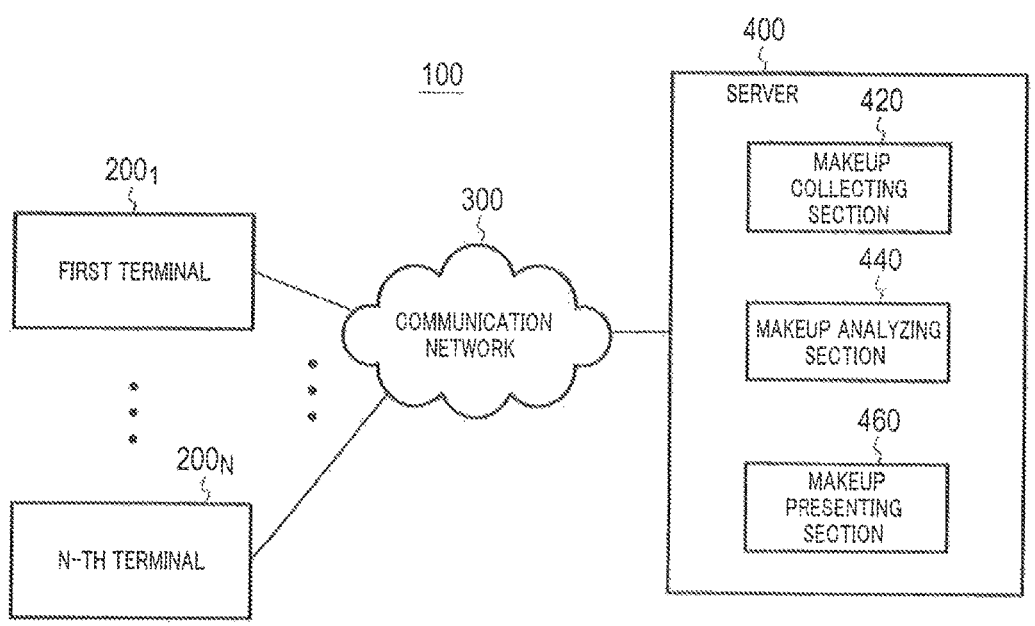
FIG. 1 is a block diagram illustrating an exemplary configuration of a makeup assisting system according to Embodiment 1 of the present invention.

FIG. 1 is a block diagram illustrating an exemplary configuration of a makeup assisting system according to the present embodiment.

In FIG. 1, makeup assisting system 100 has first to N-th (where N is an integer of two or greater) terminals $200_1$ to $200_N$, and server (a makeup assisting apparatus according to the present invention) 400 which can communicate with each of first to N-th terminals $200_1$ to $200_N$ through communication network 300.

Server 400 has makeup collecting section 420, makeup analyzing section 440 and makeup presenting section 460.

Makeup collecting section 420 collects from each of users (a plurality of persons) of first to N-th terminals $200_1$ to $200_N$, applied makeup information indicating makeup selected by the user (the person) as makeup to be applied in makeup. More specifically, makeup collecting section 420 accumulates the applied makeup information respectively transmitted from first to N-th terminals $200_1$ to $200_N$.

Makeup analyzing section 440 analyzes the collected applied makeup information and determines a selection criterion for selecting makeup to be presented to the user. More specifically, makeup analyzing section 440 analyzes the accumulated applied makeup information and determines the selection criterion for selecting makeup to be presented to the user who receives assistance for makeup.

Makeup presenting section 460 selects makeup based on the determined selection criterion and presents proposed makeup information indicating the selected makeup to the user who receives assistance for makeup.

It should be noted that the user who receives assistance for makeup may be the users of first to N-th terminals $200_1$ to $200_N$ or a user other than the users of first to N-th terminals $200_1$ to $200_N$. If the user who receives assistance for makeup is the users of first to N-th terminals $200_1$ to $200_N$, the proposed makeup information is presented to the user through communication network 300.

Server 400 includes, for example, a central processing unit (CPU), a storage medium such as a read-only memory (ROM) having a control program stored therein, a working memory such as a random access memory (RAM) and a communication circuit, which are not illustrated. In this case, functions of the above-described sections are implemented by the CPU executing the control program.

Makeup assisting system 100 configured as described above can collect applied makeup information from a plurality of users at server 400, can analyze the collected information and determine a selection criterion for selecting makeup to be presented to the user. Fashionable makeup is often makeup which is actually applied by a lot of people. Therefore, makeup assisting system 100 can estimate makeup which is actually in fashion and can select the fashionable makeup even if the trend of makeup changes over time, so that makeup assisting system 100 can appropriately assist makeup.

Embodiment 2

Embodiment 2 of the present invention is an example of a specific mode of the present invention. The present embodiment is an example in which the present invention is applied to a system having a plurality of terminals each provided with a digital camera and a display, and a server which can communicate with these plurality of terminals.

EXPLANATION OF TERMS

First, terms used in the present embodiment will be described.

A "facial part" refers to a part characterizing impression of the face, such as eyes, eyebrows, nose, cheekbones, lips and an outline.

A "facial part ID" is identification information of a facial part.

An "area of the facial part" refers to an area occupied by the facial part on an image or in real space, and includes a position of a feature point of the facial part, such as corners of the eyes.

A "facial feature value" refers to a value of a predetermined parameter which indicates features of the face. Here, the facial feature value is multivariate data including a plurality of values such as a ratio of a length of the face with respect to a width of the face, a ratio of a length of the nose with respect to a distance between both eyes and a ratio of a width of the eye with respect to the width of the face.

"Makeup" indicates the way (type) of applying makeup, and includes at least a color, application concentration and application range of a skin cosmetic agent.

A "makeup pattern" is a pattern of makeup to be applied to the whole face, and is defined by one predetermined parameter value or a combination of a plurality of predetermined parameter values.

A "makeup pattern ID" is identification information of each of a plurality of makeup patterns prepared in advance.

"Applied makeup information" is information indicating makeup selected to be applied in makeup, and is information which can be identified by the makeup pattern ID.

"Proposed makeup information" is information indicating makeup selected as makeup to be presented to a user who receives assistance for makeup, and is information which can be identified by the makeup pattern ID.

"Cosmetics information" is information relating to skin cosmetics to apply makeup.

A "cosmetics ID" is identification information of the skin cosmetics, and is information which can be used to identify the cosmetics information.

A "terminal ID" is identification information of a terminal, and is information which can be used to identify at least an address for performing communication.

A "person ID" is identification information of a user who receives assistance for makeup.

<Configuration of Makeup Assisting System>

Next, a configuration of the makeup assisting system according to the present embodiment will be described.

Figure 2:
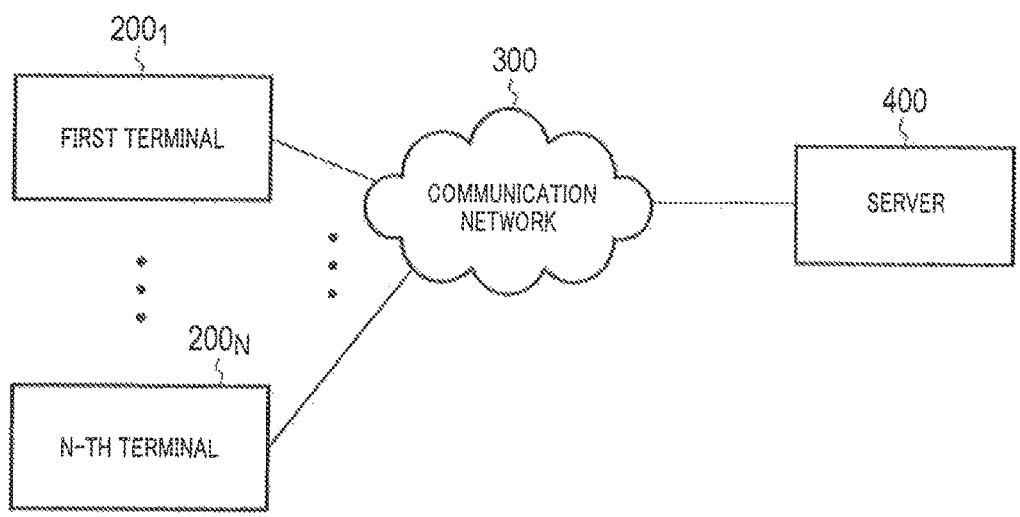
FIG. 2 is a system configuration diagram illustrating an exemplary configuration of a makeup assisting system according to Embodiment 2 of the present invention.

FIG. 2 is a system configuration diagram illustrating an exemplary configuration of the makeup assisting system according to the present embodiment.

In FIG. 2, makeup assisting system 100 has first to N-th terminals $200_1$ to $200_N$ (terminals according to the present invention), communication network 300 and server (a makeup assisting apparatus according to the present invention) 400.

First to N-th terminals $200_1$ to $200_N$ are, for example, information communication terminals such as smartphones, each provided with a digital camera and a display. It is assumed that first to N-th terminals $200_1$ to $200_N$ are respectively used by different users.

Communication network 300 is, for example, a public telecommunication network such as the Internet.

Server 400 is an information processing apparatus which can communicate with each of first to N-th terminals $200_1$ to $200_N$ through communication network 300. Server 400 assists the users of first to N-th terminals $200_1$ to $200_N$ to apply makeup.

It is assumed that first to N-th terminals $200_1$ to $200_N$ have the same configuration. Therefore, first to N-th terminals $200_1$ to $200_N$ will be collectively referred to as "terminal 200" as appropriate.

<Configuration of Terminal>

Next, a configuration of terminal 200 will be described.

Figure 3:
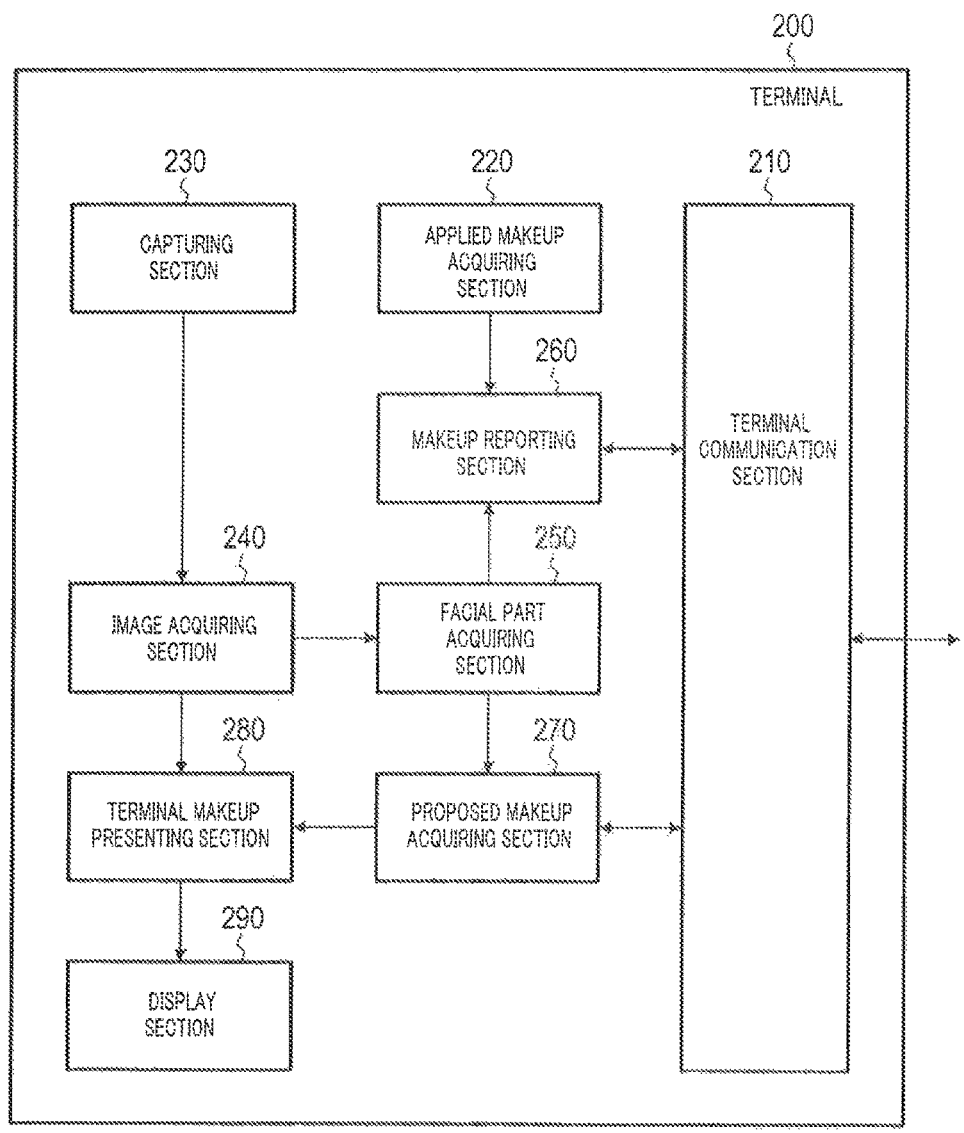
FIG. 3 is a block diagram illustrating an exemplary configuration of a terminal according to Embodiment 2.

FIG. 3 is a block diagram illustrating an exemplary configuration of terminal 200.

In FIG. 3, terminal 200 has terminal communication section 210, applied makeup acquiring section 220, capturing section 230, image acquiring section 240, facial part acquiring section 250, makeup reporting section 260, proposed makeup acquiring section 270, terminal makeup presenting section 280 and display section 290.

Terminal communication section 210 connects to communication network 300, and performs communication with server 400 through communication network 300.

Applied makeup acquiring section 220 acquires applied makeup information indicating makeup selected by a user of terminal 200 as makeup to be applied in makeup. Applied makeup acquiring section 220 outputs the acquired applied makeup information to makeup reporting section 260.

In the present embodiment, applied makeup acquiring section 220, for example, presents to the user a plurality of makeup patterns prepared in advance in a makeup pattern table to be described later, as options. Applied makeup acquiring section 220 receives from the user, selection of a makeup pattern which has been actually applied by the user. The selection of the makeup pattern is received, for example, through a display with a touch panel.

Capturing section 230, which is, for example, a digital still camera, captures an image of the face of the user of terminal 200. Capturing section 230 outputs the captured image to image acquiring section 240.

Image acquiring section 240 acquires the received image and outputs the image to facial part acquiring section 250 and terminal makeup presenting section 280.

Facial part acquiring section 250 acquires an area of a facial part of the face from each of the received images. The area of the facial part is acquired, for example, through matching between each partial area of the image and a template image of each facial part prepared in advance (for example, see PTL 2). Facial part acquiring section 250 outputs information indicating identification information and the area of the acquired facial part (hereinafter, referred to as "facial part information") to proposed makeup acquiring section 270.

Further, facial part acquiring section 250 acquires a facial feature value which is a value indicating the features of the face and outputs the acquired facial feature value to makeup reporting section 260. It should be noted that facial part acquiring section 250 may acquire the facial feature value from the facial part information or by analyzing the image separately.

Makeup reporting section 260 forms a set of the received applied makeup information, the received facial feature value, a person ID of the user of terminal 200 and a terminal ID of terminal 200. Hereinafter, this set of information will be referred to as "user information." Makeup reporting section 260 transmits an applied makeup message including the user information to server 400 through terminal communication section 210.

It is assumed in the present embodiment that the user who receives assistance for makeup is the user of terminal 200 which transmits the applied makeup message. That is, transmission of the user information to server 400 is also used as a request for receiving a response of proposed makeup information.

When the proposed makeup information is transmitted from server 400, proposed makeup acquiring section 270 receives the proposed makeup information through terminal communication section 210. Further, proposed makeup acquiring section 270 acquires cosmetics information of cosmetics required for applying the makeup indicated in the received proposed makeup information. The cosmetics information is acquired, for example, using a cosmetics table which will be described later. Proposed makeup acquiring section 270 outputs the facial part information received from facial part acquiring section 250, the received proposed makeup information and the acquired cosmetics information to terminal makeup presenting section 280.

Terminal makeup presenting section 280 presents to the user the makeup indicated in the proposed makeup information in association with the corresponding area of the facial part. More specifically, terminal makeup presenting section 280 generates a simulation image based on the received image and proposed makeup information and outputs the generated simulation image to display section 290. Here, the simulation image is an image obtained by superimposing an image in a case where the makeup indicated in the proposed makeup information is applied on the received (captured) image.

It should be noted that the image is superimposed by, for example, a publicly-known image combining process such as alpha ($\alpha$) blending process. In this case, an alpha value ($\alpha$) is set according to concentration of makeup. The alpha blending process is expressed with, for example, the following Equations 1 to 3:

[1]
$$R = r_2 \times \alpha + r_1 \times (1-\alpha) \quad \text{(Equation 1)}$$

[2]
$$G = g_2 \times \alpha + g_1 \times (1-\alpha) \quad \text{(Equation 2)}$$

[3]
$$B = b_2 \times \alpha + b_1 \times (1-\alpha) \quad \text{(Equation 3)}$$

where $r_1$, $g_1$ and $b_1$ are RGB values of an arbitrary area in the captured image, $r_2$, $g_2$ and $b_2$ are RGB values of colors of makeup, and R, G and B are RGB values of the corresponding area in the simulation image.

Further, it is assumed that an order of application when makeup is applied to the face in an overlapped manner (hereinafter, referred to as an "application order") is set for each makeup, and an image in a case where the makeup is applied is presented as an image shaded with density according to the concentration. The application order defines, for example, blush should be applied after foundation is applied. In this case, the images may be superimposed on the captured image by overpainting the image of each makeup in an order according to the application order.

Further, terminal makeup presenting section 280 further presents the received cosmetics information. More specifically, terminal makeup presenting section 280 superimposes or adds an image or text indicating the received cosmetics information on or to the above-described simulation image.

Display section 290, which is, for example, a display with a touch panel, displays (presents) the received simulation image and cosmetics information to the user of terminal 200.

It should be noted that terminal 200 has, for example, a CPU, a storage medium such as a ROM having a control program stored therein, a working memory such as a RAM and a communication circuit, which are not illustrated. In this case, functions of the above-described sections are realized by the CPU performing the control program.

<Configuration of Server>

Next, a configuration of server 400 will be described.

Figure 4:
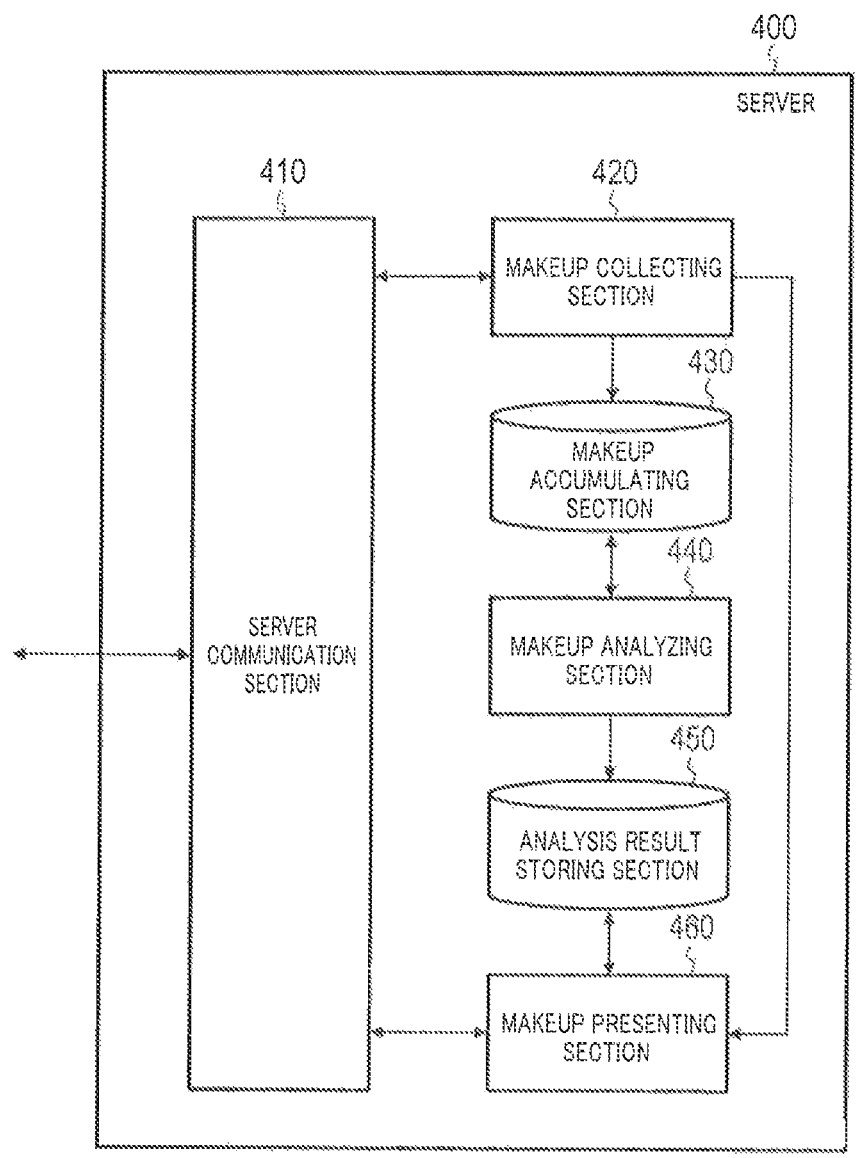
FIG. 4 is a block diagram illustrating an exemplary configuration of a server according to Embodiment 2

FIG. 4 is a block diagram illustrating an exemplary configuration of server 400.

In FIG. 4, server 400 has server communication section 410, makeup collecting section 420, makeup accumulating section 430, makeup analyzing section 440, analysis result storing section 450 and makeup presenting section 460.

Server communication section 410 connects to communication network 300, performs communication with each of first to N-th terminals 200$_1$ to 200$_N$ through communication network 300.

Makeup collecting section 420 collects the applied makeup information from each of the plurality of users of first to N-th terminals 200$_1$ to 200$_N$ through server communication section 410. More specifically, when an applied makeup message is transmitted from any of terminal 200, makeup collecting section 420 receives the applied makeup message. Makeup collecting section 420 then stores the user information included in the received applied makeup message in association with a reception time at which the user information is received, in makeup accumulating section 430.

Further, as described above, reception of the user information from terminal 200 indicates that a response of the proposed makeup information is requested. Therefore, makeup collecting section 420 outputs at least the facial feature value and the terminal ID among the received user information to makeup presenting section 460.

Makeup accumulating section 430 accumulates the user information stored (received) by makeup collecting section 420.

Makeup analyzing section 440 analyzes the user information accumulated in makeup accumulating section 430 and determines a selection criterion for selecting makeup to be presented to the user who receives assistance for makeup. More specifically, makeup analyzing section 440 estimates fashionable makeup for each facial feature value group based on a combination of the applied makeup information and the facial feature value. Makeup analyzing section 440 then determines a selection criterion so as to select the estimated fashionable makeup. Details of the analyzing method will be described later.

It is assumed that makeup analyzing section 440 does not analyze makeup until a sufficient amount of user information (applied makeup information) is accumulated.

Analysis result storing section 450 stores a makeup analysis result table indicating a result of the above-described analysis (selection criterion). The makeup analysis result table is a table in which the facial feature value which can be received from the above-described plurality of users, and a makeup pattern ID of fashionable makeup to be proposed to a user of the face having the facial feature value are registered in advance in association with each other.

It should be noted that analysis result storing section 450 stores in advance the makeup analysis result table which indicates an initial selection criterion for the makeup information to be presented until at least makeup is analyzed for the first time.

Makeup presenting section 460 selects makeup based on the determined selection criterion and presents the proposed makeup information indicating the selected makeup to the user. More specifically, makeup presenting section 460 selects fashionable makeup corresponding to the facial feature value received from makeup collecting section 420 with reference to the makeup analysis result table of analysis result storing section 450. Makeup presenting section 460 transmits the proposed makeup information indicating the selected makeup to terminal 200 indicated by the terminal ID received from makeup collecting section 420 through server communication section 410.

It should be noted that, as described above, in the makeup analysis result table, fashionable makeup is registered for each facial feature value group as makeup appropriate for the face having the facial feature value belonging to the group. Therefore, makeup presenting section 460 determines to which of the groups registered in the makeup analysis result table the received facial feature value belongs, and selects makeup corresponding to the determined group. This determination is, for example, applied by calculating a distance between the acquired facial feature value and a representative value (centroid) of each group.

It should be noted that server 400 has, for example, a CPU, a storage medium such as a ROM having a control program stored therein, a working memory such as a RAM and a communication circuit, which are not illustrated. In this case, functions of the above-described sections are implemented by the CPU performing the control program.

<Makeup Pattern ID>

Here, content of makeup indicated by the makeup pattern ID will be described.

Terminal 200 and server 400, for example, respectively store in advance makeup pattern tables having the same content in which a makeup pattern ID and content of makeup are described in association with each other. Terminal 200, for example, stores the makeup pattern table so as to be able to be referred to from applied makeup acquiring section 220, in proposed makeup acquiring section 270. Server 400, for example, stores the makeup pattern table in makeup analyzing section 440.

FIG. 5 illustrates an example of the makeup pattern table.

As illustrated in FIG. 5, makeup pattern table 510, for example, describes corresponding makeup type 512 for each makeup pattern ID 511. Makeup type 512 which is illustrated in a simplified manner in FIG. 4, specifically includes "foundation," "eye shadow," "lipstick," "blush," and the like.

Makeup pattern table 510 describes color 513, concentration 514, range 515 and cosmetics ID 516 for each combination of makeup pattern ID 511 and makeup type 512. Color 513, which is illustrated in a simplified manner in FIG. 4, specifically includes an RGB value, a gloss level, and the like. Concentration 514 which is illustrated in a simplified manner in FIG. 4, specifically includes a level of permeability, the way of gradation, and the like when an image is superimposed on the image of the face. Range 515, which is illustrated in a simplified manner in FIG. 4, specifically includes a relative coordinate group from a feature point, a set of a relative position of a central point with respect to a feature point and a radius, and the like. That is, a set of color 513, concentration 514 and range 515 includes at least information required for forming an image.

It should be noted that makeup pattern table 510 may further describe an application pattern of the cosmetics for the skin. The application pattern of the skin cosmetics is, for example, information indicating a relative range with respect to the facial part, such as eye holes, eye lines, portions below the eyes, or the like in the case of eye shadow.

For example, makeup types 512 of "MT1" to "MT4" are associated with makeup pattern ID 511 of "MP1." Further, for example, color 513 of "C1," concentration 514 of "D1," range 515 of "A1" and cosmetics ID 516 of "I1" are associated with a combination of makeup pattern ID 511 of "MP1" and makeup type 512 of "MT1." This indicates that in the makeup pattern ID of "MP1," makeup of "C1, D1 and A1" is applied for the makeup type of "MT1." Further, this indicates that in the makeup pattern ID of "MP1," cosmetics of the cosmetics ID of "I1" is used for the makeup type of "MT1."

Further, terminal 200, for example, stores in advance a cosmetics table which describes the cosmetics ID and the cosmetics information in association with each other in proposed makeup acquiring section 270.

FIG. 6 illustrates an example of a cosmetics table.

As illustrated in FIG. 6, in cosmetics table 520, company ID 522 and item number 523 are described for each cosmetics ID 521. Cosmetics ID 521 is associated with cosmetics ID 516 of makeup pattern table 510. Company ID 522 is a name or an identifier of the company which manufactures or sells the skin cosmetics. Item number 523 is an item number of the skin cosmetics.

For example, company ID 522 of "B1" and item number 523 of "b11" are associated with cosmetics ID 521 of "I1." This indicates that the cosmetics ID of "I1" is cosmetics for the skin of an item number of "b11" of a company indicated with a company ID of "B1"

It should be noted that in terminal 200, makeup pattern table 510 illustrated in FIG. 5 and cosmetics table 520 illustrated in FIG. 6 may be integrated into one table.

<Analysis of Applied Makeup Information>

Next, an example of a method for analyzing the applied makeup information will be described.

Makeup analyzing section 440 of server 400 first performs principal component analysis on the facial feature value among the accumulated user information. Makeup analyzing section 440 groups results of the principal component analysis of the facial feature value into a plurality of groups using a publicly known principal component grouping method in which judgment is applied based on a determination criterion such as whether or not a principal component value is 1σ or higher. Makeup analyzing section 440 determines for each facial feature value group, a representative value (centroid) of each group as a representative facial feature value.

Further, for each facial feature value group, makeup analyzing section 440 performs principal component analysis on the applied makeup information corresponding to the facial feature value belonging to each group. Makeup analyzing section 440 groups results of the principal component analysis of the applied makeup information into a plurality of groups by a publicly known principal component grouping method. Makeup analyzing section 440 determines for each applied makeup information group, a makeup pattern with the shortest distance to the representative value (centroid) of each group as a representative makeup pattern.

As a result, makeup analyzing section 440 associates a plurality of representative makeup patterns for each representative facial feature value. Makeup analyzing section 440 then sets priority on the plurality of representative makeup patterns for each representative facial feature value.

There are, for example, the following three possible methods for setting priority.

The first method is a method in which priority is set on the representative makeup patterns in a descending order of the number of items of corresponding applied makeup information. This corresponds to determination of a selection criterion so as to preferentially select makeup which has a larger number of items of the corresponding applied makeup information (that is, fashionable makeup).

The second method is a method in which priority is set on the representative makeup patterns in a reverse chronological order of an average time at which the corresponding applied makeup information has been received. This corresponds to determination of a selection criterion so as to preferentially select the makeup whose average time at which the corresponding applied makeup information has been acquired is later (that is, makeup on the cutting edge of trend).

The third method is a method in which priority is set on the representative makeup patterns in a descending order of a rate of increase in the number of corresponding applied makeup information items. This corresponds to determination of a selection criterion so as to preferentially select makeup having a higher rate of increase in the number of corresponding applied makeup information items (that is, makeup which is about to be in fashion).

As a result of such analysis, makeup analyzing section 440 can classify the facial feature value into groups and can associate for each facial feature value group, a makeup pattern which is representative of makeup applied to the face belonging to the group. Further, makeup analyzing section 440 can associate makeup which is actually in fashion for each facial feature value group. Makeup analyzing section 440 generates/updates the above-described makeup analysis result table based on this analysis result.

It should be noted that in a case where a makeup pattern of a trend which has not been accumulated (which is not in a database) in makeup accumulating section 430, that is, applied makeup information indicating a novel makeup pattern is received, makeup analyzing section 440 may detect the novel makeup pattern. If detecting the novel makeup pattern, makeup analyzing section 440 may determine a selection criterion so as to preferentially select the makeup pattern. Such a novel makeup pattern is the above-described makeup pattern having a high rate of increase when the number of items of the applied makeup information which have been already accumulated in makeup accumulating section 430 is set as a parameter.

Specific process for detecting a novel makeup pattern is, for example, as described below. Makeup analyzing section 440 first applies principal component loading which has already been analyzed to the received makeup pattern and calculates principal component values. Next, makeup analyzing section 440 calculates an inner product of a vector comprised of the principal component values and a vector including a principal component value of the representative makeup pattern of each group which has already been grouped. If values of the inner product for all the groups are equal to or greater than a threshold, makeup analyzing section 440 determines that the makeup pattern received this time as a novel makeup pattern.

Further, makeup analyzing section 440 may perform principal component analysis again periodically (for example, every time a certain number of items of applied makeup information is received) and detect a sign of trend of a new makeup pattern by detecting whether or not there is a new group. If detecting such a sign, makeup analyzing section 440 may determine a selection criterion so as to preferentially select the corresponding makeup pattern.

Makeup assisting system 100 having the above-described configuration can collect the applied makeup information and the facial feature value from a plurality of users of a plurality of terminal 200 in server 400. Makeup assisting system 100 can estimate fashionable makeup for each facial feature value group by analyzing the collected information in server 400. Makeup assisting system 100 can determine a table in which fashionable makeup is associated for each facial feature value group as a selection criterion of the proposed makeup information. That is, makeup assisting system 100 can appropriately assist makeup even if the trend of makeup changes over time.

<Operation of Terminal>

Next, operation of terminal 200 will be described.

Figure 7:
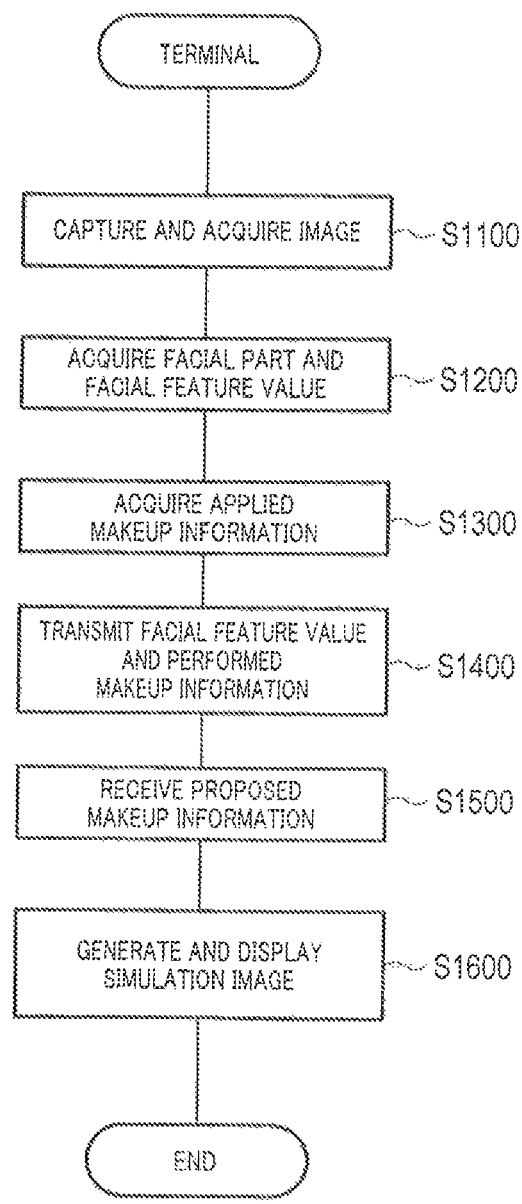
FIG. 7 is a flowchart illustrating exemplary operation of the terminal according to Embodiment 2.

FIG. 7 is a flowchart illustrating exemplary operation of terminal 200. Terminal 200, for example, performs process illustrated in FIG. 7 every time a makeup pattern is selected as makeup to be applied in makeup.

First, in step S1100, capturing section 230 captures a moving image of the face of the user, and image acquiring section 240 acquires images included in the captured moving image.

Figure 8:
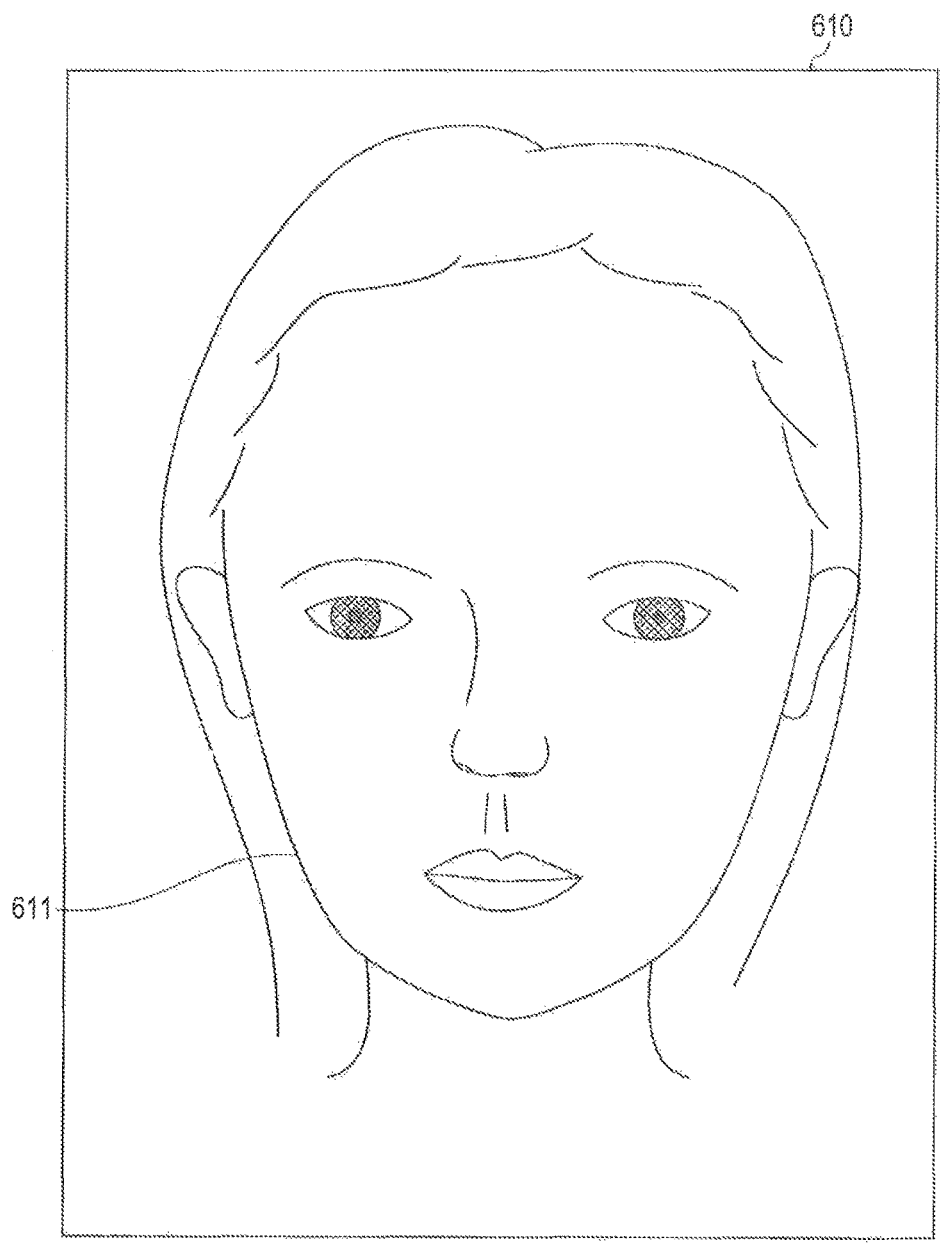
FIG. 8 illustrates an example of an image in Embodiment 2.

FIG. 8 illustrates an example of the image acquired in step S1100 in FIG. 7.

As illustrated in FIG. 8, image 610 includes an image of the face of the user (hereinafter, referred to as a "face image") 611. It is assumed that the user wears no makeup.

In step S1200 of FIG. 7, facial part acquiring section 250 acquires the facial part and the facial feature value from image 610. At this time, facial part acquiring section 250, for example, extracts feature points (of the facial part) of the face from image 610 by analyzing image 610. Facial part acquiring section 250 acquires an area formed with the feature points constituting the same facial part as an area of the facial part. Facial part acquiring section 250 generates facial part information from the acquired area of the facial part. Further, facial part acquiring section 250 acquires the facial feature value, for example, including values such as a ratio of a length of the face with respect to a width of the face, a ratio of a length of the nose with respect to a distance between the both eyes and a ratio of a width of the eye with respect to the width of the face from the extracted feature points of the face.

Figure 9:
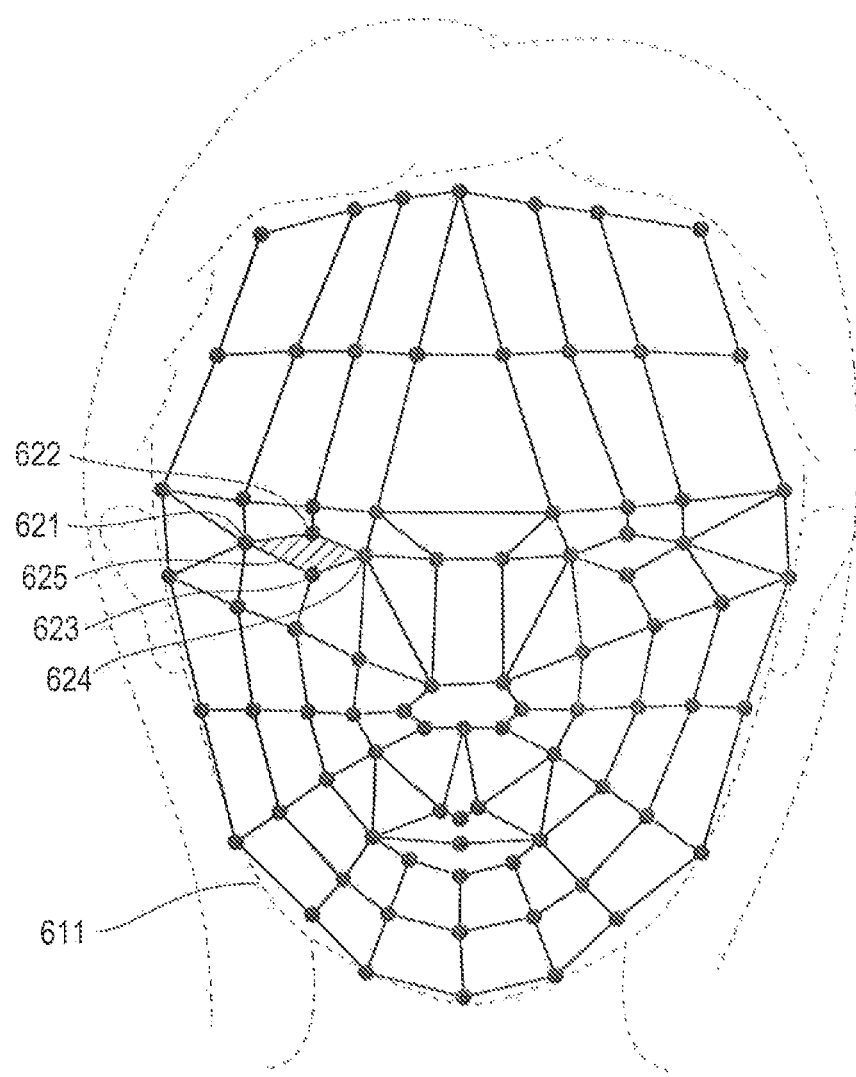
FIG. 9 illustrates an example of placement of feature points of the face in Embodiment 2.

FIG. 9 illustrates an example of placement of feature points of the face, extracted in step S1200 of FIG. 7.

As illustrated in FIG. 9, a plurality of feature points (expressed with a symbol "●") are extracted from face image 611. For example, first to fourth feature points 621 to 624 constitute the right eye. Therefore, facial part acquiring section 250 acquires area 625 enclosed by first to fourth feature points 621 to 624 as an area of the right eye.

Figure 10:
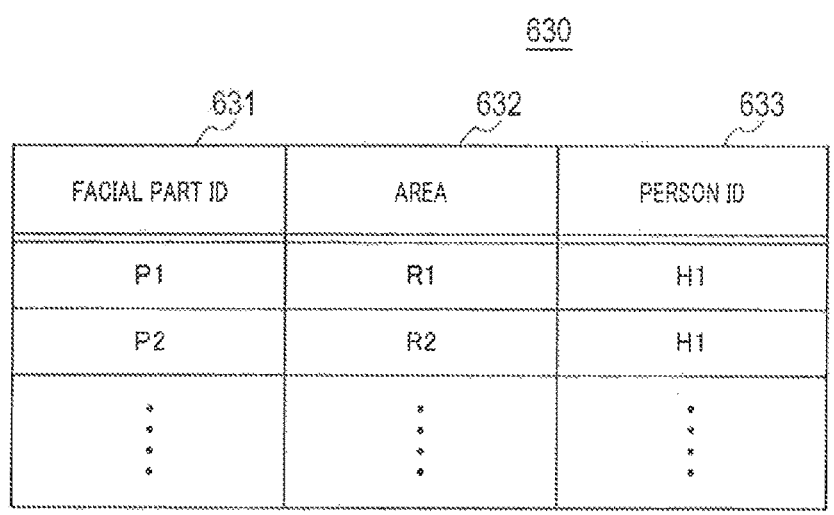
FIG. 10 illustrates an example of facial part information in Embodiment 2.

FIG. 10 illustrates an example of the facial part information generated in step S1200 of FIG. 7.

As illustrated in FIG. 10, facial part information 630, for example, describes area 632 and person ID 633 for each facial part ID 631. Area 632 which is information indicating a range of the area of the facial part in the image, is, for example, a list of coordinate values of a coordinate system set on the image. As person ID 633, for example, a value designated by the user through operation to a display with touch panel or the like is set every time capturing is started.

Further, as the facial feature value, multivariate data is acquired in which, for example, the above-described ratio of the length of the face with respect to the width of the face, the ratio of the length of the nose with respect to the distance between the both eyes, the ratio of the width of the eye with respect to the width of the face, and the like are lined.

In step S1300 of FIG. 7, applied makeup acquiring section 220 acquires the applied makeup information. This acquisition of the applied makeup information is, in other words, acquisition of the makeup pattern ID.

In step S1400, makeup reporting section 260 transmits the facial feature value and the applied makeup information to server 400. This transmission of the facial feature value and the applied makeup information is, in other words, transmission of the applied makeup message.

FIG. 11 illustrates an example of the applied makeup message.

As illustrated in FIG. 11, applied makeup message 640 includes, for example, terminal ID 641, person ID 642, makeup pattern ID 643 and feature value of face 644. Terminal ID 641 is a terminal ID of terminal 200. Person ID 642 is a person ID of a person whose feature value of face 644 is to be extracted. Makeup pattern ID 643, which is the applied makeup information, is a makeup pattern ID of makeup selected for the person whose feature value of face 644 is to be extracted.

It should be noted that between step S1400 and the subsequent step S1500, operation illustrated in FIG. 14 which will be described later is applied at server 400. As a result, a proposed makeup message including the proposed makeup information is sent back from server 400 to terminal 200 as a response to transmission of the user information.

In step S1500 of FIG. 7, proposed makeup acquiring section 270 receives the proposed makeup information from server 400. This reception of the proposed makeup information is, in other words, reception of the proposed makeup message.

FIG. 12 illustrates an example of the proposed makeup message.

In FIG. 12, in proposed makeup message 650, a plurality of makeup pattern IDs 653 are associated with a set of terminal ID 651 and person ID 652. Terminal ID 651 indicates a destination of proposed makeup message 650. A plurality of makeup pattern IDs 653 are makeup pattern IDs of makeup patterns having the highest priority among makeup patterns to be proposed to person ID 652.

In step S1600 of FIG. 7, terminal makeup presenting section 280 generates a simulation image based on the proposed makeup information included in the proposed makeup information and makes display section 290 display the simulation image. At this time, terminal makeup presenting section 280 makes display section 290 also display the cosmetics information.

Figure 13:
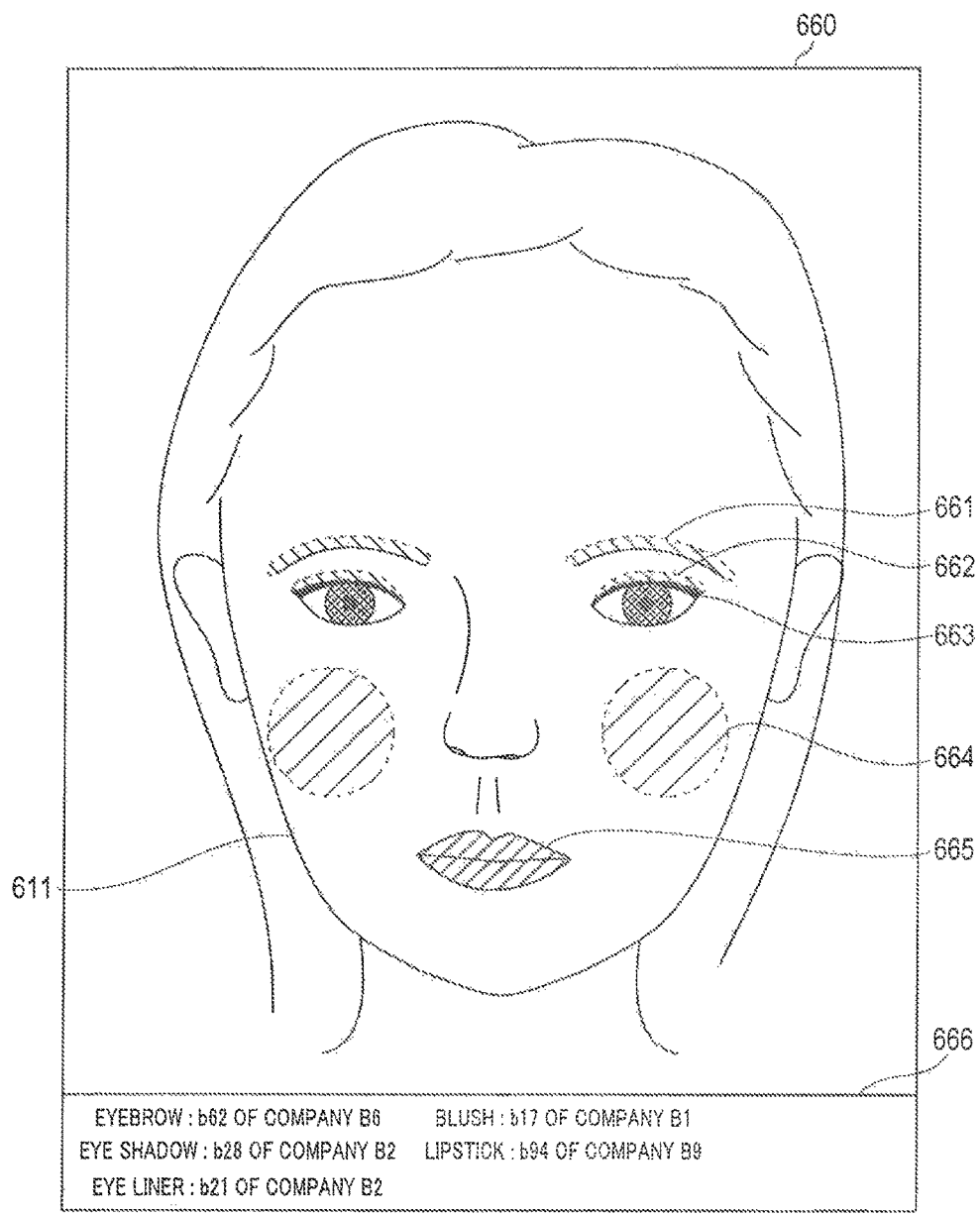
FIG. 13 illustrates an example of a simulation image in Embodiment 2.

FIG. 13 illustrates an example of the simulation image displayed in step S1600 of FIG. 7.

As illustrated in FIG. 13, simulation image 660 is an image obtained by superimposing images 661 to 665 of makeup for the face such as eye brow, eye shadow, eye liner, blush and lipstick on facial image 611.

Further, information display area 666 which indicates the cosmetics information is added to simulation image 660. That is, in simulation image 660, the cosmetics information of the skin cosmetics required for applying the selected makeup is also displayed. If the user likes makeup shown in the displayed simulation image 660, the user can get required skin cosmetics based on the displayed cosmetics information and can easily put on her makeup, actually.

Through the above-described operation, terminal 200 can transmit to server 400 the applied makeup information of the user along with the facial feature value, can receive information regarding fashionable makeup which suits for the face of the user and can present the information to the user.

<Operation of Server>
Next, operation of server 400 will be described.

Figure 14:
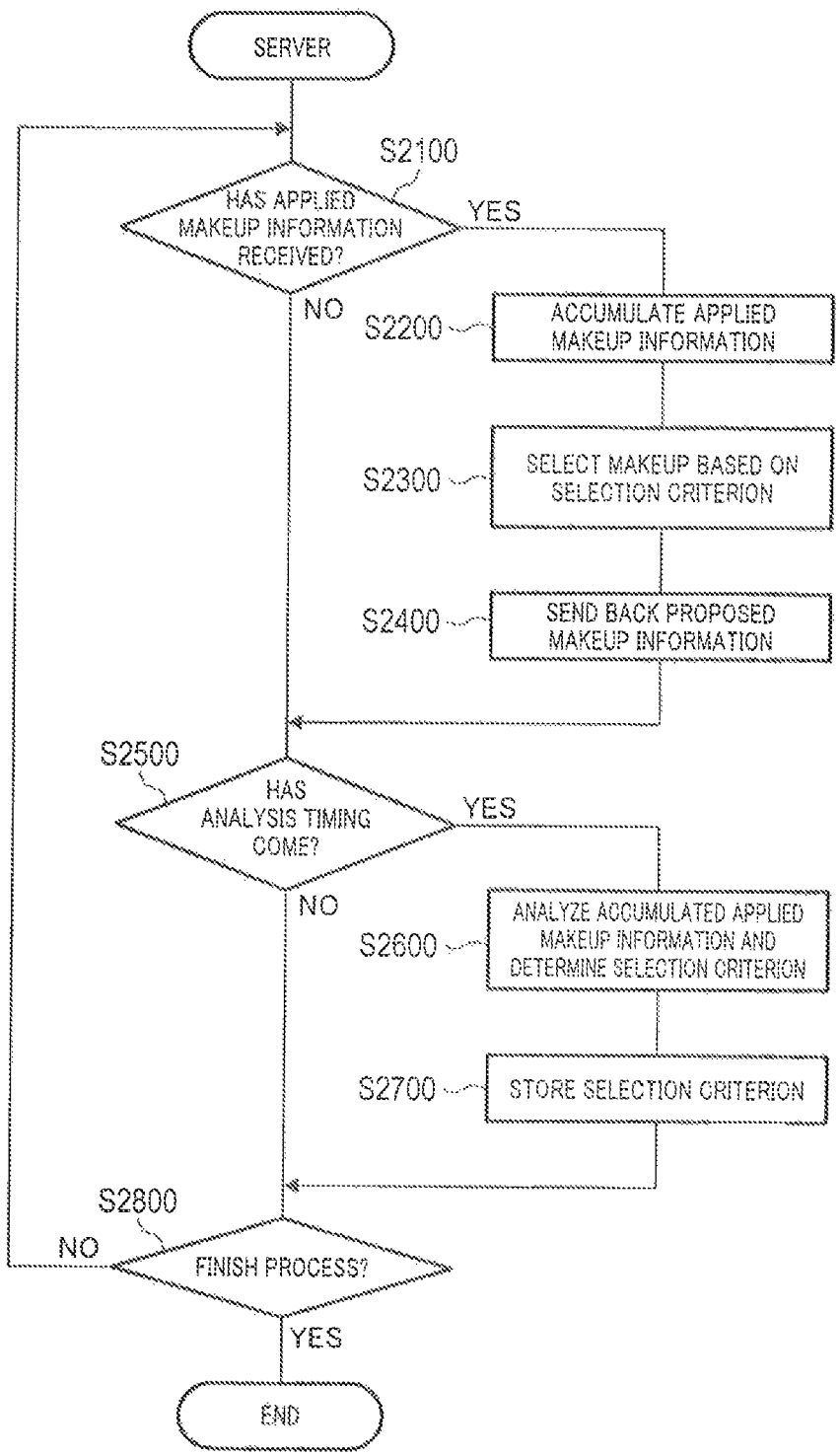
FIG. 14 is a flowchart illustrating exemplary operation of a server according to Embodiment 2.

FIG. 14 is a flowchart illustrating exemplary operation of server 400.

First, in step S2100, makeup collecting section 420 judges whether or not the applied makeup information (user information) is received from terminal 200. This reception of the applied makeup information is, in other words, reception of the applied makeup message.

If makeup collecting section 420 does not receive the applied makeup information (S2100: No), the flow proceeds to step S2500 which will be described later. Further, if makeup collecting section 420 receives the applied makeup information (S2100: Yes), the flow proceeds to step S2200.

It should be noted that makeup collecting section 420 may collect the user information by requesting first to N-th terminals $200_1$ to $200_N$ to, for example, regularly transmit the user information for the makeup newly selected as makeup to be applied in makeup.

In step S2200, makeup collecting section 420 accumulates the received applied makeup information in makeup accumulating section 430 in association with the reception time of the applied makeup information. This accumulation of the applied makeup information is, in other words, accumulation of the user information and the reception time. Hereinafter, a set of the user information and the reception time will be referred to as a "user information history."

FIG. 15 illustrates an example of the user information history stored in makeup accumulating section 430.

As illustrated in FIG. 15, user information history 670 describes terminal ID 671, person ID 672, makeup pattern ID 673 and feature value of face 674 (that is, the user information), and reception time 675 in association with each other.

In step S2300 of FIG. 14, makeup analyzing section 440 selects makeup based on a current selection criterion. The current selection criterion is, in other words, a makeup analysis result table stored in analysis result storing section 450. Makeup is selected by determining to which of the groups registered in the makeup analysis result table the received facial feature value belongs and selecting makeup corresponding to the determined group as described above.

FIG. 16 illustrates an example of the makeup analysis result table stored in analysis result storing section 450.

As illustrated in FIG. 16, makeup analysis result table 680, for example, describes a plurality of makeup pattern IDs 682 in association with each other for each facial feature value group 681. The plurality of makeup pattern IDs 682 are makeup pattern IDs of makeup patterns having the highest priority among makeup patterns to be proposed to the person having the facial feature value belonging to facial feature value group 681.

For example, the makeup pattern ID of "MP1" is associated with facial feature value group 681 of "G1." Therefore, if the facial feature value transmitted from terminal 200 belongs to facial feature value group 681 of "G1," makeup presenting section 460 determines makeup pattern ID 682 of "MP1" as the makeup information to be presented.

In step S2400 of FIG. 14, makeup presenting section 460 sends back the proposed makeup information indicating the selected makeup to terminal 200. This sending back of the proposed makeup information is, in other words, sending back of the proposed makeup message.

In step S2500, makeup analyzing section 440 judges whether or not a timing at which the applied makeup information accumulated in makeup accumulating section 430 should be analyzed has come. This timing is, for example, a timing at which an amount (the number of items)

of the accumulated applied makeup information becomes a predetermined value or higher and a predetermined period of time has elapsed since the last analysis.

If the timing at which the analysis should be applied has not come (S2500: No), the flow proceeds to step S2800 which will be described later. Further, if the timing at which the analysis is to be applied has come (S2500: Yes), the flow proceeds to step S2600.

In step S2600, makeup analyzing section 440 determines a selection criterion by analyzing the accumulated applied makeup information. That is, makeup analyzing section 440 classifies the facial feature value and estimates fashionable makeup from the applied makeup information collected from the plurality of users.

In step S2700, makeup analyzing section 440 stores the determined selection criterion in analysis result storing section 450. That is, makeup analyzing section 440 updates makeup analysis result table 680 (see FIG. 16) based on the analysis result of the accumulated applied makeup information. Updated makeup analysis result table 680 will be used when the process proceeds to step S2300 next time.

In step S2800, makeup collecting section 420 judges whether or not it is instructed through operation by an operator, or the like of server 400 to finish the process.

If makeup collecting section 420 is not instructed to finish the process (S2800: No), the flow returns to step S2100. Further, if makeup collecting section 420 is instructed to finish the process (S2800: Yes), a series of processes is finished.

Through the above-described operation, server 400 can collect applied makeup information from first to N-th terminals $200_1$ to $200_N$ and can analyze the applied makeup information and can feed back the analysis result to each terminal 200 while estimating fashionable makeup for each facial feature value group.

Effect of Present Embodiment

As described above, makeup assisting system 100 according to the present embodiment collects applied makeup information from each of the plurality of persons, analyzes the collected information and determines a selection criterion for selecting makeup to be presented to the user. Makeup assisting system 100 presents to the user makeup determined based on the determined selection criterion. More specifically, makeup assisting system 100 determines the selection criterion for selecting makeup to be proposed from the number of times each makeup pattern has been selected as makeup to be actually applied, how recent the makeup pattern has been selected, a rate of increase in the number, and the like.

Fashionable makeup is often makeup actually applied by a larger number of people. Therefore, makeup assisting system 100 according to the present embodiment can estimate makeup which is actually in fashion and can select the makeup even if the trend of makeup changes over time, so that makeup assisting system 100 can appropriately assist makeup.

<Options of Presented Makeup>

While in the present embodiment, a selection criterion for selecting one makeup pattern from the facial feature value as makeup to be presented has been illustrated, the present invention is not limited to this. For example, server 400 may send back to terminal 200 a plurality of makeup patterns having the highest priority as the presented makeup information.

In this case, terminal 200, for example, presents a plurality of makeup patterns indicated by the received presented makeup information as options and sets the selected makeup pattern as the makeup pattern to be presented by terminal makeup presenting section 280. More specifically, terminal 200 makes display section 290 display identification information of the plurality of makeup patterns at proposed makeup acquiring section 270. Terminal 200 makes proposed makeup acquiring section 270 output the proposed makeup information of the makeup pattern selected by the user through operation with respect to a display with a touch panel, or the like to terminal makeup presenting section 280.

<Other Makeup Selection Methods>

Further, makeup assisting system 100 may group the applied makeup information based on a parameter other than the facial feature value. For example, makeup assisting system 100 may group the applied makeup information based on various types of attribute of the person, such as occupation, age and a resident area. In this case, server 400 needs to collect information required for the group in association with the applied makeup information. By this means, makeup assisting system 100 can present more appropriate makeup if appropriate makeup is different according to the attribute of the person.

Further, makeup assisting system 100 may determine a selection criterion for selecting the makeup pattern taking into account other index values such as a priority order of cosmetics companies in addition to the number of times each makeup pattern has been applied, how recent each makeup pattern has been applied, a rate of increase in the number, and the like. For example, makeup assisting system 100 may determine a selection criterion so as to preferentially select cosmetics of a certain cosmetics company while selecting fashionable makeup.

<Application of Cosmetics Information>

Further, terminal 200 may associate link information to a web site where the user can purchase the skin cosmetics with the displayed cosmetics information. In this case, terminal 200 enables the corresponding website to be displayed through communication network 300 when the user performs operation to determine the makeup, so that it is possible to assist makeup more effectively. Further, it is possible to promote sales of cosmetics for cosmetics companies.

<Other Information to be Presented>

Further, terminal 200 may generate and display a simulation image of the face for which makeup has been halfway finished instead of the simulation image of the face for which all the makeup has been applied. Further, if an application order is set for each makeup as described above, terminal 200 may sequentially generate and display simulation images of the face for which makeup has been halfway finished according to the application order. Accordingly, terminal 200 can present to the user an appropriate order of the makeup.

Further, terminal 200 may present association with the area of the selected makeup and color and concentration of the selected makeup using text. This text is, for example, "please apply blush of item number b55 of company B1 heavily to ranges with a diameter of about 4 cm centering around the highest points of the both cheekbones," or the like. Some users can imagine the face to which makeup has been applied only from the text information. It is possible to sufficiently assist such users to apply makeup even with such a presenting method. By this means, makeup assisting system 100 can assist makeup without generating and displaying an image.

<Other Makeup Presenting Methods>

Further, terminal 200 may present makeup using methods other than the method using the simulation image.

For example, terminal 200 is connected to a printer which transfers a cosmetic agent of the skin cosmetics to a predetermined thin film (a paper-like medium). This thin film supports the transferred cosmetic agent so as to be able to be easily peeled off. Therefore, the cosmetic agent on the thin film is easily transferred to the skin by being pressed against the skin.

Terminal 200 sets the same shape and area as those of an area in real space of the captured face to the thin film at terminal makeup presenting section 280 and instructs the printer to transfer makeup to the corresponding area. It should be noted that the thin film may be either a planar shape or a steric shape.

Accordingly, terminal 200 can present makeup to the user on the thin film in association with the corresponding areas.

The user can actually put on the makeup selected based on the simulation image by pressing the entire thin film against the face while aligning positions indicating the corners of the both eyes printed on the thin film to the corners of the both eyes of the user. That is, the user can apply fashionable makeup easily and quickly without applying a cosmetic agent for each facial part.

Further, terminal 200 may capture a moving image of the face of the user using a digital video camera, or the like, and may generate and display a simulation image in real time for an image (frame) included in the captured moving image. In this case, terminal makeup presenting section 280 only has to sequentially generate the simulation image for each of the images included in the moving image and make display section 290 display the simulation image while maintaining makeup indicated by the proposed makeup information once input corresponding to the moving image.

<Other Applied Makeup Information Acquisition Methods>

Further, applied makeup acquiring section 220 may receive selection of the makeup pattern by receiving selection of makeup for each part, for example, for each eye shadow and for each blush, and combining the received makeup. Further, applied makeup acquiring section 220 may extract a makeup pattern of actually applied makeup from a facial image of the user and acquire the applied makeup information by, for example, converting the extracted makeup pattern into multivariate data. In this case, the number of options of the makeup pattern becomes enormous. Therefore, it is desirable that, particularly, in this case, makeup assisting system 100 uses the multivariate data of the makeup pattern as is as the applied makeup information instead of using the makeup pattern ID.

Modification Examples of Other Configuration

A person to whom the proposed makeup information is to be presented does not necessarily have to be a user who has transmitted the applied makeup information. For example, server 400 may transmit the proposed makeup information selected based on the determined selection criterion to a terminal which is not a terminal from which the applied makeup information is collected or may present the proposed makeup information to an operator of server 400.

Further, the cosmetics information may be acquired at server 400. In this case, for example, it is only necessary to prepare a cosmetics table at server 400 and transmit the cosmetics information from server 400 to terminal 200 along with the proposed makeup information.

Further, in the present embodiment, maintenance of the makeup analysis result table and selection of the makeup pattern based on the makeup analysis result table may be applied at terminal 200 instead of at server 400. In this case, server 400 needs to transmit the makeup analysis result table to terminal 200, and terminal 200 needs to have a functional section corresponding to makeup presenting section 460.

Further, the specific items of makeup are not limited to the above-described examples. For example, makeup for the face to be presented includes mascara, lip gloss, and the like.

Further, although a case has been described where the present invention is applied to a system including a server and a plurality of terminals in the present embodiment, the present invention may take a form in which data is shared directly between terminals and analysis and the like processes are applied at each terminal.

A makeup assisting apparatus according to the present disclosure includes: a makeup collecting section that collects, from each of a plurality of persons, an applied makeup information item indicating makeup selected by the person as makeup to be applied in makeup; a makeup analyzing section that estimates fashionable makeup by analyzing the collected applied makeup information items and that determines a selection criterion in such a way that the estimated fashionable makeup is selected; and a makeup presenting section that selects makeup based on the determined selection criterion and that presents a proposed makeup information item indicating the selected makeup to a user.

The makeup assisting apparatus may further include a communication section that communicates with a plurality of terminals respectively used by the plurality of persons, and the makeup collecting section may collect the applied makeup information items via the communication section.

In the makeup assisting apparatus, the user is included in the plurality of person, and the makeup presenting section may present the proposed makeup information item to the user via the communication section.

In the makeup assisting apparatus, the makeup analyzing section may determine the selection criterion in such a way that the makeup having a larger number of corresponding applied makeup information items is preferentially selected.

In the makeup assisting apparatus, the makeup analyzing section may determine the selection criterion in such a way that the makeup whose average time at which the corresponding applied makeup information items are acquired is later is preferentially selected.

In the makeup assisting apparatus, the makeup analyzing section may determine the selection criterion in such a way that the makeup having a higher rate of increase in the number of corresponding applied makeup information items is preferentially selected.

In the makeup assisting apparatus: the makeup collecting section may further collect a predetermined information item other than the applied makeup information item from the plurality of persons; the makeup analyzing section may determine the selection criterion for each content of the predetermined information based on a combination of the applied makeup information item and the predetermined information item; and the makeup presenting section may acquire from the user the predetermined information item of the user and select makeup based on the selection criterion corresponding to a content of the acquired predetermined information item.

In the makeup assisting apparatus: the plurality of persons may each select makeup to be applied in makeup from a plurality of types of makeup prepared in advance, the plurality of types of makeup being each defined by one predetermined parameter value or a combination of a plurality of predetermined parameter values; and the applied makeup information item may include the one or the plurality of parameter values defining the selected makeup.

In the makeup assisting apparatus, the makeup may include at least a color, application concentration and application range of a skin cosmetic agent.

A makeup assisting system according to the present disclosure includes: a plurality of terminals; and a server configured to communicate with each of the plurality of terminals through a communication network, in which: the terminal includes: a makeup acquiring section that acquires an applied makeup information item indicating makeup selected by a user of the terminal as makeup to be applied in makeup; and a makeup reporting section that transmits the acquired applied makeup information item to the server; and the server includes: a makeup collecting section that accumulates the applied makeup information items transmitted from of the plurality of terminals; a makeup analyzing section that estimates fashionable makeup by analyzing the accumulated applied makeup information items and determines a selection criterion in such a way that the estimated fashionable makeup is selected; and a makeup presenting section that selects makeup based on the determined selection criterion and that presents a proposed makeup information item indicating the selected makeup to a user receiving assistance for the makeup.

In the makeup assisting system: the terminal may further include a terminal makeup presenting section that presents, when the proposed makeup information item indicating the makeup selected in the server is transmitted from the server, the proposed makeup information item to the user; and the makeup presenting section of the server may transmit the proposed makeup information item to at least one of the plurality of terminals.

A makeup assisting method according to the present disclosure includes: collecting from each of a plurality of persons, an applied makeup information item indicating makeup selected by the person as makeup to be applied in makeup; estimating fashionable makeup by analyzing the collected applied makeup information items and determining a selection criterion in such a way that the estimated fashionable makeup is selected; selecting makeup based on the determined selection criterion; and presenting a proposed makeup information item indicating the selected makeup to a user.

The disclosure of the specification, drawings, and abstract in Japanese Patent Application No. 2013-018274 filed on Feb. 1, 2013 is incorporated herein by reference in its entirety.

INDUSTRIAL APPLICABILITY

The present invention is useful as a makeup assisting apparatus, a makeup assisting system and a makeup assisting method which enable appropriate assistance for makeup even if the trend of makeup changes over time.

REFERENCE SIGNS LIST

100 Makeup assisting system
200 Terminal
210 Terminal communication section
220 Applied makeup acquiring section
230 Capturing section
240 Image acquiring section
250 Facial part acquiring section
260 Makeup reporting section
270 Proposed makeup acquiring section
280 Terminal makeup presenting section
290 Display section
300 Communication network
400 Server
410 Server communication section
420 Makeup collecting section
430 Makeup accumulating section
440 Makeup analyzing section
450 Analysis result storing section
460 Makeup presenting section

What is claimed is:

1. A makeup assisting apparatus, comprising:
a first memory that stores instructions;
a second memory that stores a makeup analysis result table in which a facial feature value group is registered for selecting a fashionable makeup that is relatively more frequently applied by a person;
a processor that executes the instructions stored in the first memory to perform operations, and that accesses the makeup analysis result table in the second memory, the instructions including
collecting, from each of a plurality of people using one or more computer terminals, an applied makeup information, indicating makeup selected by the person to be applied in a makeup application and including images of faces of the plurality of people taken by a camera at the one or more computer terminals;
judging, each time the applied makeup information is collected, whether or not an analyzing time has arrived at which the fashionable makeup should be analyzed, the analyzing time being a timing at which a predetermined quantity of the applied makeup information has been accumulated and a predetermined period of time has elapsed since an immediately preceding analyzing time;
estimating the fashionable makeup each time a judgement is made that the analyzing time has arrived, by analyzing accumulated applied makeup information from the plurality of people;
determining a selection criterion from a facial feature value group registered in the makeup analysis result table in the second memory;
selecting a makeup pattern based on the selection criterion; and
presenting proposed makeup information indicating the makeup pattern selected and cosmetics information of cosmetics required for applying the makeup pattern selected to the person, including a generated simulation image that superimposes the makeup pattern selected, based on the proposed makeup information, on a facial image of the person collected by the camera at the one or more computer terminals,
wherein the generated simulation image obtained based on the makeup pattern selected is superimposed on the facial image of the person collected by the camera by an alpha blending process using equations, including $R = r_2 \times \alpha + r_1 \times (1-\alpha);$ $G = g_2 \times \alpha + g_1 \times (1-\alpha);$ and $B = b_2 \times \alpha + b_1 \times (1-\alpha),$ wherein $r_1$, $g_1$ and $b_1$ are RGB values of an area in the facial image of the person, $r_2$, $g_2$ and $b_2$ are RGB values of colors of an area in a makeup image obtained based on the makeup pattern selected, and wherein R, G and B are RGB values of an area in the generated simulation image, and $\alpha$ is set based on concentration of the colors of the area in the makeup image obtained on the makeup pattern selected.

2. A makeup assisting method, comprising:

storing instructions in a first memory;

storing a makeup analysis result table in a second memory, in which a facial feature value group is registered for selecting a fashionable makeup that is relatively more frequently applied by a person;

executing, by a processor, the instructions stored in the first memory to perform operations, and that accesses the makeup analysis result table in the second memory, the operations including collecting, from each of a plurality of people using one or more computer terminals, an applied makeup information indicating makeup selected by the person to be applied in a makeup application and including images of faces of the plurality of people taken by a camera at the one or more computer terminals;

judging, each time the applied makeup information is collected, whether or not an analyzing time has arrived at which the fashionable makeup should be analyzed, the analyzing time being a timing at which a predetermined quantity of the applied makeup information has been accumulated and a predetermined period of time has elapsed since an immediately preceding analyzing time;

estimating the fashionable makeup each time a judgement is made that the analyzing time has arrived, by analyzing accumulated applied makeup information from the plurality of people;

determining a selection criterion from a facial feature value group referring to the makeup analysis result table in the second memory in which the facial feature value group is registered for selecting the fashionable makeup;

selecting a makeup pattern based on the selection criterion; and presenting proposed makeup information indicating the makeup pattern selected and cosmetics information of cosmetics required for applying the makeup pattern selected to the person, including a generated simulation image that superimposes the makeup pattern selected, based on the proposed makeup information, on a facial image of the person collected by the camera at the one or more computer terminals, wherein the generated simulation image obtained based on the makeup pattern selected is superimposed on the facial image of the person collected by the camera by an alpha blending process using equations, including $R = r_2 \times \alpha + r_1 \times (1-\alpha);$ $G = g_2 \times \alpha + g_1 \times (1-\alpha);$ and $B = b_2 \times \alpha + b_1 \times (1-\alpha),$ wherein $r_1$, $g_1$ and $b_1$ are RGB values of an area in the facial image of the person, $r_2$, $g_2$ and $b_2$ are RGB values of colors of an area in the makeup image obtained based on the makeup pattern selected, and wherein R, G and B are RGB values of an area in the generated simulation image, and $\alpha$ is set based on concentration of the colors of the area in the makeup image obtained on the makeup pattern selected.

3. A non-transitory computer-readable storage medium comprising a makeup assisting program that causes a computer to execute processing, comprising:

storing instructions in a first memory;

storing a makeup analysis result table in a second memory, in which a facial feature value group is registered for selecting a fashionable makeup that is relatively more frequently applied by a person;

executing, by a processor, the instructions stored in the first memory to perform operations, and that accesses the makeup analysis result table in the second memory, the operations including collecting, from each of a plurality of people using one or more computer terminals, an applied makeup information, indicating makeup selected by the person to be applied in a makeup application and including images of faces of the plurality of people taken by a camera at the one or more computer terminals;

judging, each time the applied makeup information is collected, whether or not an analyzing time has arrived at which the fashionable makeup should be analyzed, the analyzing time being a timing at which a predetermined quantity of the applied makeup information has been accumulated and a predetermined period of time has elapsed since an immediately preceding analyzing time;

estimating the fashionable makeup each time a judgement is made that the analyzing time has arrived, by analyzing accumulated applied makeup information from the plurality of people;

determining a selection criterion from a facial feature value group referring to the makeup analysis result table in the second memory in which the facial feature value group is registered for selecting the fashionable makeup;

selecting a makeup pattern based on the selection criterion; and presenting proposed makeup information indicating the makeup pattern selected and cosmetics information of cosmetics required for applying the makeup pattern selected to the person, including a generated simulation image that superimposes the makeup pattern selected, based on the proposed makeup information, on a facial image of the person collected by the camera at the one or more computer terminals, wherein the generated simulation image obtained based on the makeup pattern selected is superimposed on the facial image of the person collected by the camera by an alpha blending process using equations, including $R = r_2 \times \alpha + r_1 \times (1-\alpha);$ $G = g_2 \times \alpha + g_1 \times (1-\alpha);$ and $B = b_2 \times \alpha + b_1 \times (1-\alpha),$ where $r_1$, $g_1$ and $b_1$ are RGB values of an area in the facial image of the person, $r_2$, $g_2$ and $b_2$ are RGB values of colors of an area in the makeup image obtained based on the makeup pattern selected, and wherein R, G and B are RGB values of an area in the generated simulation image, and $\alpha$ is set based on concentration of the colors of the area in the makeup image obtained on the makeup pattern selected.

* * * * *